(12) United States Patent
Choe et al.

(10) Patent No.: US 7,607,332 B2
(45) Date of Patent: Oct. 27, 2009

(54) APPARATUS FOR REMOVING DENT IN SHEET METAL AND METHOD THEREOF

(76) Inventors: Beom-Seok Choe, 230 W. 105th St., Apt. 7B, New York, NY (US) 10025; Hoon Kim, 40 Greenacres Ave., Scarsdale, NY (US) 10583

( * ) Notice: Subject to any disclaimer, the term of this patent is extended or adjusted under 35 U.S.C. 154(b) by 0 days.

(21) Appl. No.: 11/870,701

(22) Filed: Oct. 11, 2007

(65) Prior Publication Data
US 2008/0034829 A1   Feb. 14, 2008

(51) Int. Cl.
*B21D 37/16* (2006.01)
*B21C 1/16* (2006.01)

(52) U.S. Cl. .................. 72/342.6; 72/430; 72/705

(58) Field of Classification Search .......... 72/705, 72/430, 342.1, 342.2, 342.5, 342.6, 342.94, 72/342.96
See application file for complete search history.

(56) References Cited

U.S. PATENT DOCUMENTS

| | | | |
|---|---|---|---|
| 3,998,081 A | 12/1976 | Hansen et al. | |
| 4,007,616 A * | 2/1977 | Aleck | 72/38 |
| 4,061,007 A | 12/1977 | Hansen et al. | |
| 4,127,933 A | 12/1978 | Hansen et al. | |
| 4,676,088 A * | 6/1987 | Okada et al. | 72/342.6 |
| 4,754,637 A | 7/1988 | Odell | |
| 4,986,102 A | 1/1991 | Hendrickson et al. | |
| 6,684,677 B1 | 2/2004 | Bar et al. | |
| 2004/0168495 A1 | 9/2004 | Berg | |
| 2006/0001515 A1 | 1/2006 | Berg | |
| 2006/0191126 A1 | 8/2006 | Berg | |
| 2007/0114298 A1 * | 5/2007 | O'Keefe | 239/2.1 |

FOREIGN PATENT DOCUMENTS

| | | |
|---|---|---|
| KR | 10-0628347 | 9/2006 |
| WO | 2006/119661 | 11/2006 |
| WO | WO 2006/119661 A1 * | 11/2006 |
| WO | WO2006119661 | 11/2006 |

* cited by examiner

*Primary Examiner*—Dana Ross
*Assistant Examiner*—Debra M Sullivan
(74) *Attorney, Agent, or Firm*—Lexyoume IP Group, LLC.

(57) ABSTRACT

An apparatus for removing a dent in finished sheet metal heats a steel panel by applying a high frequency induced current thereto and simultaneously cools a clear coat by spraying a coolant to a surface of the sheet metal and a cooling pipe, wherein the finished sheet metal is composed of at least the ferromagnetic steel panel and the non-ferromagnetic clear coat having different thermal expansion coefficient and thermal damage temperature.

11 Claims, 6 Drawing Sheets

APPARATUS FOR REMOVING DENT IN SHEET METAL AND METHOD THEREOF

BACKGROUND OF THE INVENTION (a) Field of the Invention

The present invention generally relates to an apparatus and a method for removing a dent in sheet metal. More particularly, the present invention relates to an apparatus for removing the dent in sheet metal of an auto body that is coated with non-conductive material having a different thermal expansion coefficient than metal and method thereof.

(b) Description of the Related Art

In general, various induction heating methods such as heating by induction furnace, induction welding, induction cooking, induction sealing have been developed. The induction heating method has advantages of precisely controlling the temperature and location of a heating zone, but is of applicability only to conductive material such as ferrous metal. The automobile repair industry recently began to use the induction heating method in various applications such as removing front windshield and/or rear window and decorative moldings, heating bolt and nuts, and removing minor dents on the sheet metal. Basically, the induction heating method removes the dent of the sheet metal using the fact that only ferrous metal is heated by the electromagnetic field. The sheet metal used in the auto body is generally composed of four layers which are steel panel, paint primer, paint, and clear coat. The paint primer and the paint are relatively thin layers among the four layers. The clear coat, on the other hand, should have enough thickness to endure extreme weather condition. When the auto body is heated by the induction heater, the electromagnetic field induces joule heating on the steel panel through the outer three non-ferrous layers. Then, those outer three layers are heated indirectly by the heated steel panel. Since the thermal expansion coefficient of the steel panel is high, the heated steel panel starts to expand as soon as it is heated. However, there is a short time period between when induction heating is applied and when the clear coat becomes flexible from the indirect heat. Therefore, if the sheet metal is heated circularly around the dented area, the sheet metal is bent toward the clear coat momentarily having tensile force before the heat is transferred from the steel panel, and thus the dent is removed.

In a conventional apparatus for removing dents in auto bodies, the sheet metal is heated by high frequency induction. However, the excessive increase in the temperature of the steel panel causes thermal damage to the clear coat and the paint.

Furthermore, when the heat generated by the high frequency induction is used in the conventional dent remover of the sheet metal, the power of the high-frequency electromagnetic field may cause malfunction of sensors and electronic devices that are mounted near the auto body because the electromagnetic field may cause damage to electronic circuits.

In a conventional induction heating device, a diameter of a wire of the induction coil should be greater than a critical value in order to sufficiently heat the steel panel for removing the dent without damage to the induction coil. If the temperature of the induction coil is decreased, the wire having smaller diameter can be applied to the induction heating device because an electrical resistance of the wire having the same diameter is reduced at a lower temperature of the induction coil.

The above information in this "Background" section is disclosed only to enhance understanding of the background of the invention and therefore it may contain information that does not form the prior art that is already known in this country to a person of ordinary skill in the art.

SUMMARY OF THE INVENTION

Accordingly, the present invention has been made to solve the above-mentioned problems occurring in the prior art, and an object of the present invention is to provide an apparatus for removing a dent in sheet metal of an auto body that is coated with at least one layer of non-conductive finishing coat such as an enamel clear coat, and a thermal treatment method thereof. Thus, the dent is removed without thermal damage to the non-conductive coating layer of the sheet metal and without disassembling parts of the auto body. More particularly, when a coolant is simultaneously applied to the finished sheet metal and to the cooling pipe during the induction heating, clear coat and paint of the finished sheet metal are not thermally damaged and a stronger restoring force for removing the dent can be obtained.

A further object of the present invention is to prevent thermal damage to sensors and electronic devices located near the sheet metal of an auto body during the induction heating process.

In order to accomplish these objects, there is provided an apparatus for removing a dent in sheet metal which includes a hollow housing, a cylinder disposed in the housing, a coil wound at an exterior circumference of the cylinder, a cooling pipe disposed in the cylinder for supplying coolant to the finished sheet metal and the cooling pipe in the cylinder, and an induced current generating module for applying a high frequency induced current to the coil.

The controller includes a cooling module for supplying the coolant to the cooling pipe by a switching operation of the first switch, an induced-current generating module for applying the high-frequency induced current to the coil, and a power supply. The controller further includes a display module. A fan is mounted at the housing, and at least one air hole is formed at an exterior circumference of the housing. Preferably, the coolant is liquefied carbon dioxide.

A method for removing a dent in sheet metal according to another exemplary embodiment of the present invention is a method for removing a dent formed toward a steel panel in the sheet metal with a clear coat that is non-ferromagnetic. The steel panel is heated by applying a high-frequency induced current thereto, and the clear coat is cooled. Heating of the steel panel and cooling of the clear coat are performed spirally from a border to a center of the dent. The non-ferromagnetic clear coat is cooled by a coolant. The coolant preferably is liquefied carbon dioxide.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described with reference to the accompanying drawings. In the following description of the present invention, a detailed description of known functions and configurations incorporated herein is omitted to avoid making the subject matter of the present invention unclear.

Figure 1:
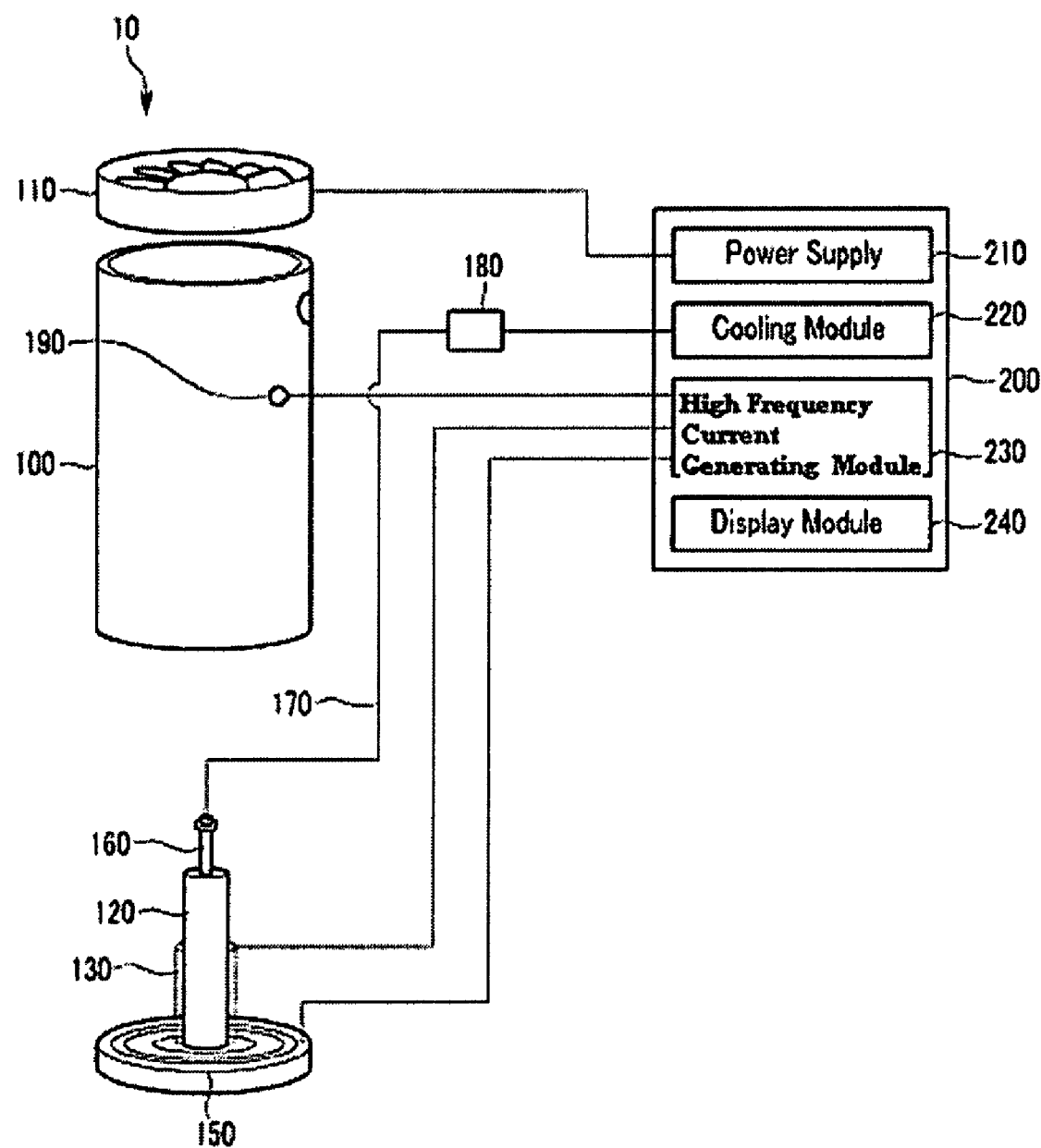
FIG. 1 is an exploded assembly view of an apparatus for removing a dent in sheet metal according to the present invention.
Figure 2:
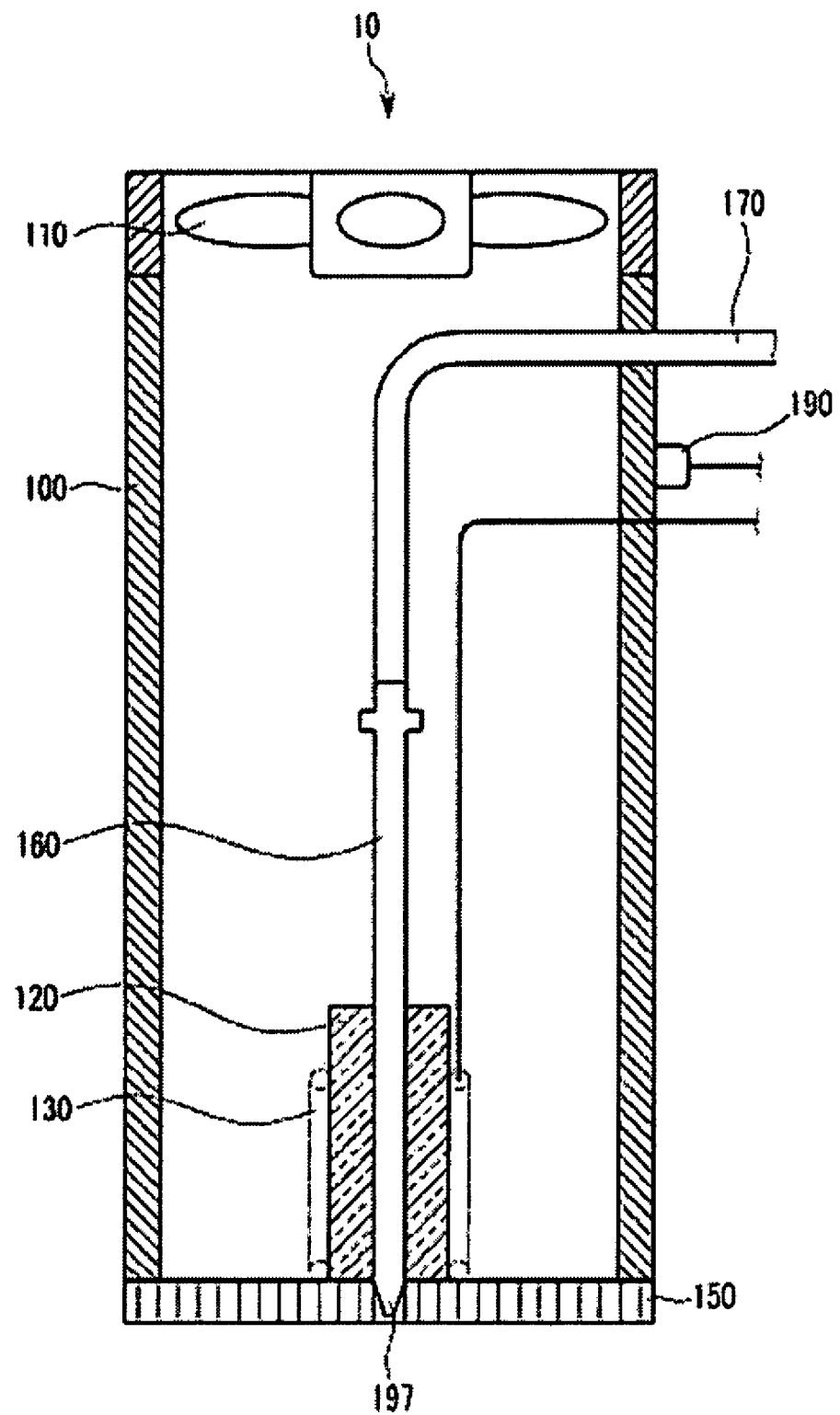
FIG. 2 is a cross-sectional view of a dent remover of FIG. 1.

FIG. 1 is an exploded assembly view of an apparatus for removing a dent in sheet metal, and FIG. 2 is a cross-sectional view of a dent remover according to an exemplary embodiment of the present invention.

As illustrated in FIGS. 1 and 2, an apparatus for removing a dent in sheet metal according to an exemplary embodiment of the present invention includes a dent remover 10 and a controller 200.

The dent remover 10 includes a housing 100, a fan 110, and a cylinder 120.

The housing 100 is hollow, and is made of a non-ferromagnetic material. The size of the housing 100 is such that a user can easily grasp the housing 100. According to an exemplary embodiment of the present invention, the housing 100 has a cylindrical shape, but the present invention does not limit the specific shape to only cylindrical shape. The cylinder 120 is installed in the housing 100 and the fan 110 is mounted at an upper end of the housing 100.

The cylinder 120 is made of a non-ferromagnetic material, e.g., ceramic, and a cooling pipe 160 is formed in the cylinder 120 along an axial direction thereof. The cooling pipe 160 is connected to a connecting hose 170, and is preferably made of a synthetic resin such as plastic. A nozzle 197 is installed at an end of the cooling pipe 160. The connecting hose 170 is preferably made of a flexible material such as rubber. A coil 130 is wound at an exterior circumference of the cylinder 120. In addition, a connecting body 150 is combined with the housing 100 such that the coil 130 is mounted in the housing 100.

The controller 200 includes a power supply 210, a cooling module 220, an induced current generating module 230, and a display module 240.

The power supply 210 is electrically connected to a battery or external power source, and supplies electrical energy to respective components of the controller 200. In addition, the power supply 210 is connected to the fan 110 and supplies electrical energy thereto.

The cooling module 220 is operated by a switching operation of a first switch 180, and includes a storage (not shown) for storing coolant and a valve (not shown) for controlling supply of the coolant. The valve is connected to and is controlled by the first switch 180. In addition, the cooling module 220 is connected to the cooling pipe 160 through the connecting hose 170.

The induced current generating module 230 is operated by a switching operation of a second switch 190, and produces a high frequency induced current. In addition, the induced current generating module 230 is electrically connected to the coil 130, and supplies the induced current to the coil 130 by the operation of the second switch 190. Power of the high frequency induced current produced at the induced current generating module 230 is low and frequency thereof is high in order to prevent malfunction of sensors and electronic devices.

The display module is electrically connected to the power supply 210, the cooling module 220, and the induced current generating module 230, and displays output of the power supply 210, a condition of the coolant stored in the storage of the cooling module 220, and information of the high frequency induced current.

Figure 3:
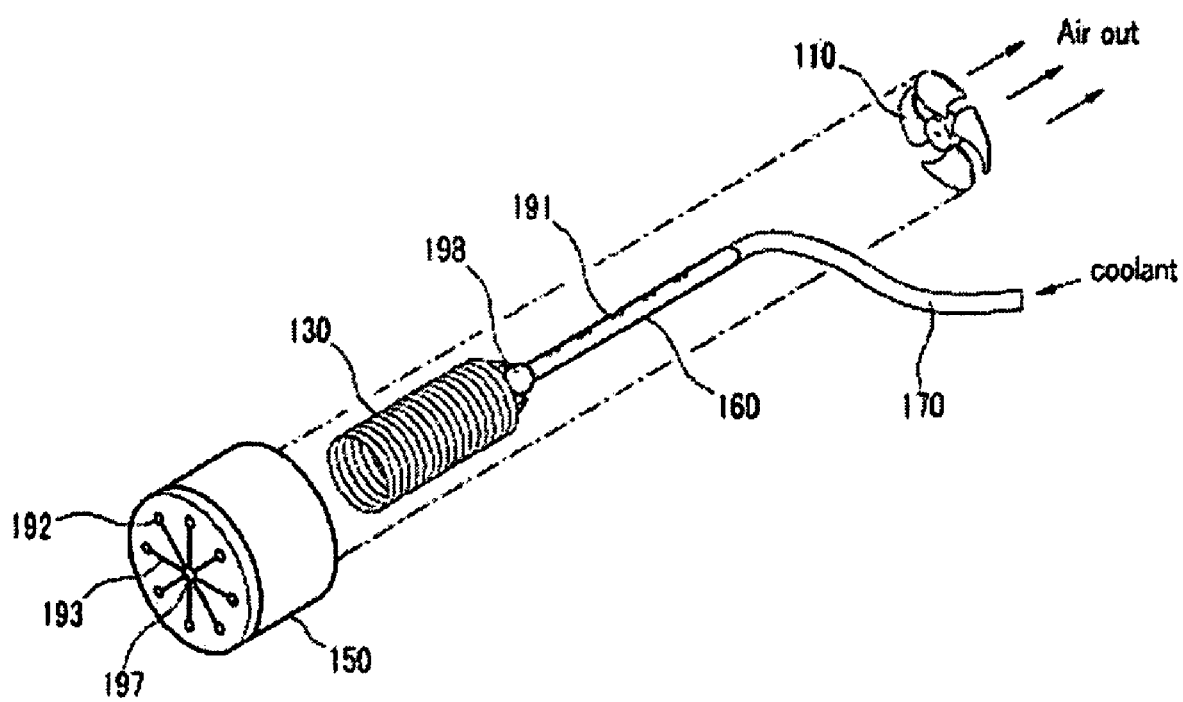
FIG. 3 is a partial exploded assembly view of FIG. 1.

FIG. 3 is a partial exploded assembly view of an apparatus for removing a dent in sheet metal illustrating the flow of the coolant in the apparatus of the present invention.

A plurality of first air holes 191 are formed at an exterior circumference of the cooling pipe 160 along an axial direction thereof. The cylinder 120 further includes a cap 198 for sealing air gap between the cooling pipe 160 and the cylinder 120. The cap 198 is mounted in an upper end of the cylinder 120. Therefore, the coolant in the cooling module 220 is sprayed to the cylinder 120 through the first air holes 191 formed at the cooping pipe 160.

A plurality of second air holes 192 and air grooves 193 are formed at a lower part of the connecting body 150. The air grooves 193 are formed connecting the nozzle 197 to the second air holes 192, respectively. Therefore, the coolant is sprayed to the sheet metal through the air grooves 193 installed between the nozzle 197 and the second holes 192

The fan 110 draws hot air in the housing 100 from the housing 100 and cools an exterior circumference of the coil 130. Hot air in the housing 100 is exhausted through the fan 110.

Figure 4:
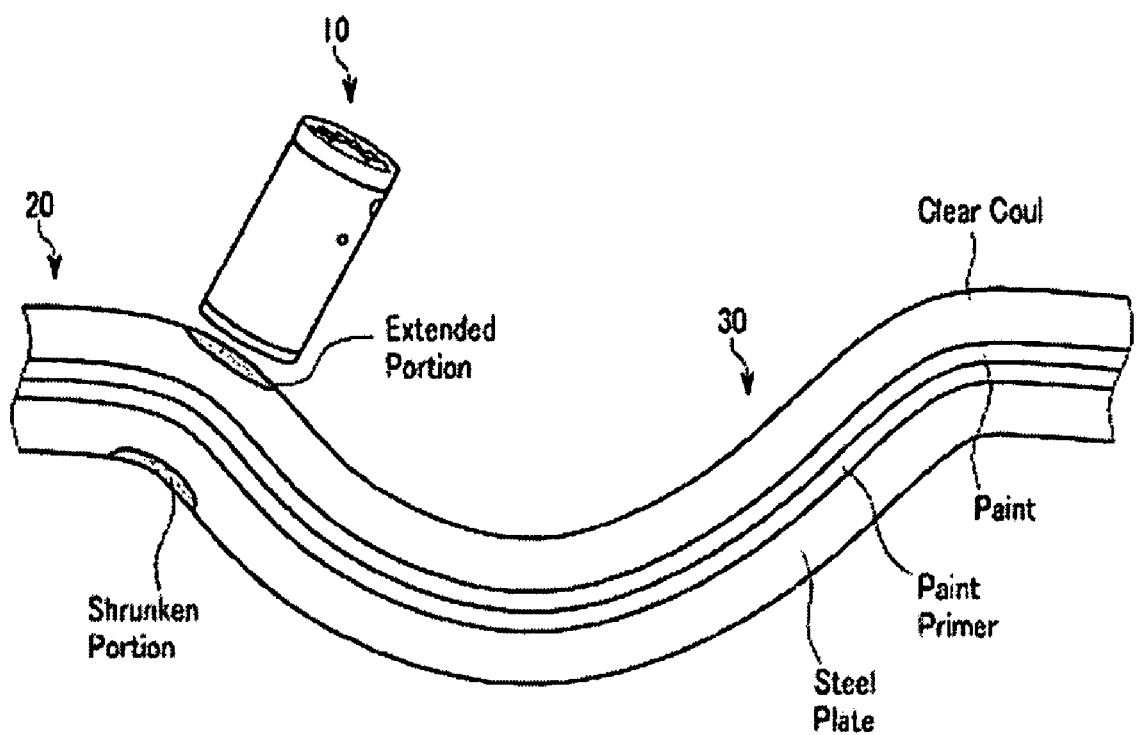
FIG. 4 is a schematic representation illustrating operation of an apparatus for removing a dent in sheet metal according to the present invention.
Figure 5:
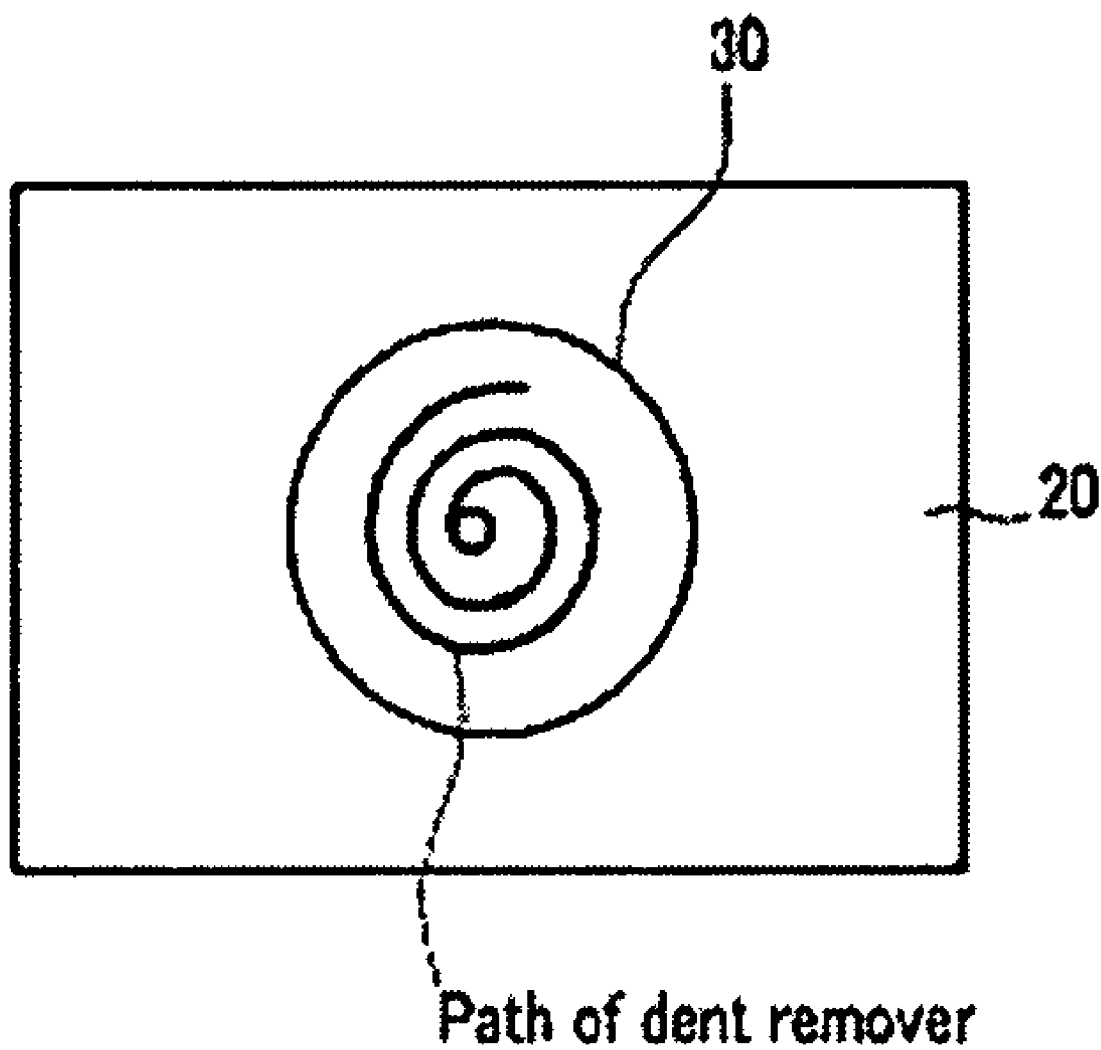
FIG. 5 is a schematic representation illustrating a method for removing a dent in sheet metal according to the present invention.

FIG. 4 is a schematic diagram showing operation of an apparatus for removing a dent in finished sheet metal according to an exemplary embodiment of the present invention, and FIG. 5 is a schematic diagram showing a method for removing a dent in sheet metal according to another exemplary embodiment of the present invention being performed.

As illustrated in FIG. 4, the finished sheet metal 20 used in a vehicle body is composed of four layers of the sheet metal that is ferromagnetic, a paint primer, paint, and a clear coat that is non-ferromagnetic, and the clear coat is disposed outermost. In a case that a dent 30 occurs in the finished sheet metal 20, an expanded portion is generated at the clear coat and a shrunken portion is generated at the sheet metal at a border of the dent 30. The apparatus for removing the dent in the sheet metal according to the exemplary embodiment of the present invention supplies the high frequency induced current to the coil 130 and heats the ferromagnetic steel panel. In this case, since the thermal expansion coefficient of the steel panel is larger than that of the clear coat, the border region of the dent 30 is bent toward the clear coat. More particularly, the shrunken portion expands more than the expanded portion.

In addition, since the paint and the clear coat that are generally degraded at 150° C. may be damaged by the heat of the steel panel, the apparatus for removing the dent in the sheet metal according to the exemplary embodiment of the present invention sprays the coolant onto the clear coat through the nozzle 197 and the air grooves 193. More particularly, the steel panel is high-frequency heated and the clear coat is cooled such that deformation of the paint and the clear coat caused by the heat of the steel panel is prevented and the restoring force of the sheet metal is increased. Any coolant that a person of ordinary skill in the art deems preferable may be used in the embodiment of the present invention. The coolant is preferably liquefied carbon dioxide.

As described above, if the dent 30 in the finished sheet metal 20 is removed by heating the steel panel and cooling the clear coat, the expanded portion and the shrunken portion are induced toward a center of the dent 30. Therefore, as illustrated in FIG. 5, a method for removing a dent in sheet metal according to an exemplary embodiment of the present invention is performed spirally from the border region to the center of the dent 30.

Figure 6:
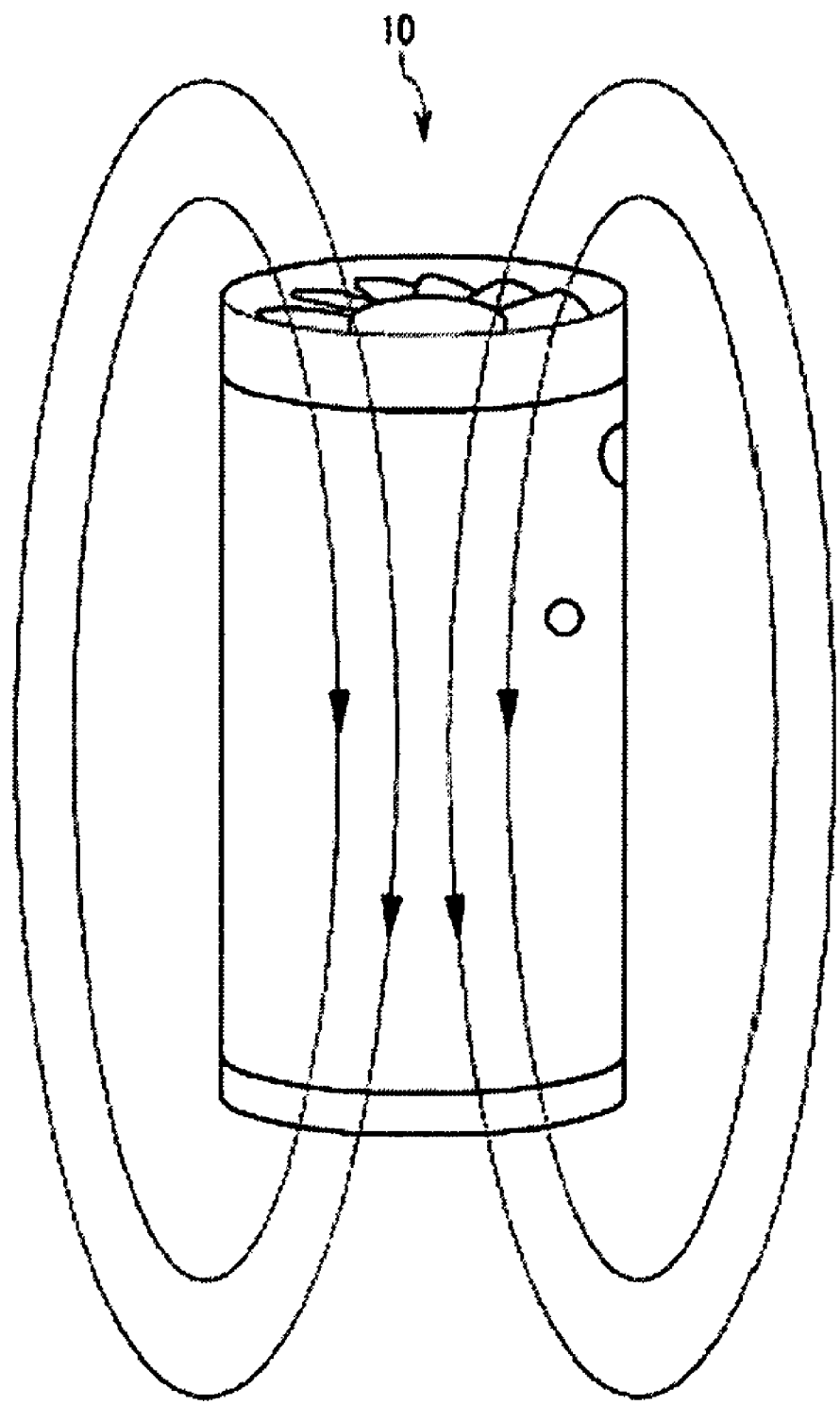
FIG. 6 is a schematic representation illustrating lines of magnetic force in a case that only a coil is used in an apparatus for removing a dent in sheet metal according to the present invention.

FIG. 6. is a schematic diagram of lines of magnetic force in a case that a coil 130 is used in an apparatus for removing a dent in sheet metal according to an exemplary embodiment of the present invention.

As illustrated in FIG. 6, in a case in which the high frequency induced current produced in the induced current generating module 230 is applied only to the coil 130, lines of magnetic force pass a region that is narrow and close to the dent remover 10.

Meanwhile, the clear coat may be cooled by thermoelectric element.

According to the present invention, since a steel panel is high-frequency heated and a clear coat is simultaneously cooled, the clear coat and paint may not be damaged by heat of the steel panel and a restoring force of the sheet metal may be increased.

In addition, since the steel panel is heated by an induced current that has relatively low power and high frequency, sensors and electronic devices located close to a vehicle body may not be damaged and vibration may not occur.

In addition, since the head of the dent remover is contacted to the sheet metal when the dent remover is used, the dent removing process may be facilitated.

Further, since the heating position may be controlled by operation of the coil, the dent removing process may be precisely performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for removing a dent in finished sheet metal, comprising:
    a hollow housing;
    a cylinder disposed in the housing;
    a coil wound at an exterior circumference of the cylinder;
    a cooling pipe disposed in the cylinder for supplying a coolant to the finished sheet metal and the cylinder;
    an induced current generating module for applying a high frequency induced current to the coil, wherein a plurality of first air holes are formed at an exterior circumference of the cooling pipe along an axial direction thereof; and
    a connecting body mounted in a lower portion of the housing, the connecting body having a plurality of second air holes and air grooves formed at a lower part of the connecting body.

2. The apparatus of claim 1, wherein a nozzle is installed at an end of the cooling pipe for spraying the coolant to an exterior surface of the finished sheet metal.

3. The apparatus of claim 1, wherein the cylinder further includes a cap for sealing air gap between the cooling pipe and the cylinder and is mounted in an upper end of the cylinder.

4. The apparatus of claim 1, wherein a fan is mounted at an upper end of the housing.

5. The apparatus of claim 1, wherein the induced current generating module further comprises a power supply and a display module.

6. The apparatus of claim 1, wherein the coolant is liquefied carbon dioxide.

7. The apparatus of claim 1, wherein the cooling pipe further includes a first switch for controlling supply of the coolant.

8. A method for removing a dent in finished sheet metal, wherein the dent that is formed toward a steel panel is removed and where the steel panel is ferromagnetic and has a high thermal expansion coefficient and where the steel panel is coated at an exterior surface by a clear finishing coat that is non-ferromagnetic and has a low thermal expansion coefficient, and
    wherein the steel panel is heated by applying a high frequency induced current thereto, and the clear coat is cooled by spraying a coolant from a plurality of first air holes formed at an exterior circumference of a cooling pipe along an axial direction thereof and a plurality of second air holes and air grooves formed at a lower part of a connecting body mounted in a lower portion of a housing.

9. The method of claim 8, wherein heating of the steel panel and cooling of the clear coat are performed spirally from a border to a center of the dent.

10. The method of claim 8, wherein the non-ferromagnetic clear coat is cooled by a coolant.

11. The method of claim 8, wherein the coolant is liquefied carbon dioxide.

* * * * *